W. E. ELAM.
TOBACCO PIPE.
APPLICATION FILED JAN. 13, 1909.
921,527.
Patented May 11, 1909.
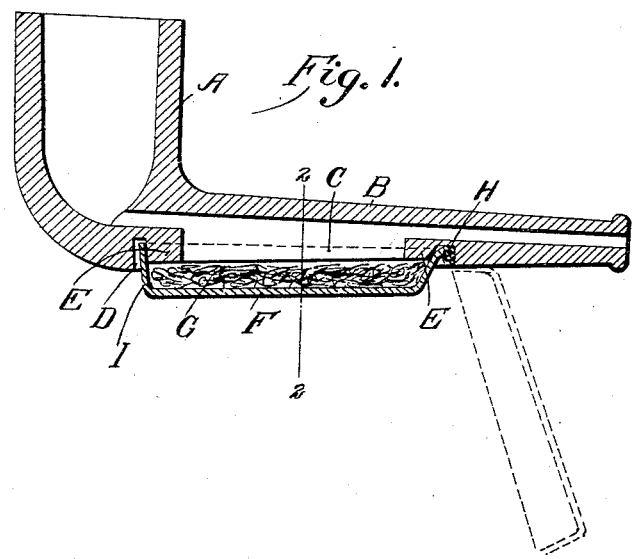
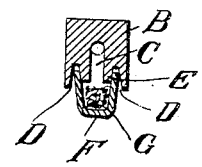
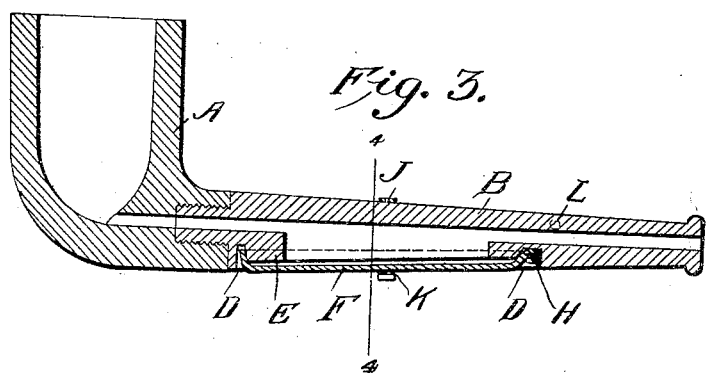
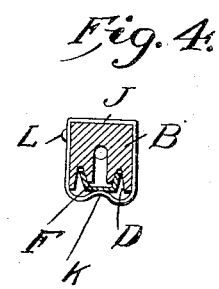
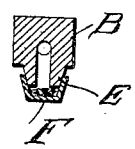
Witnesses
Jos. F. Collins
James L. Crawford
Inventor
William E. Elam
By Wallace Irwin
Attorney

UNITED STATES PATENT OFFICE.

WILLIAM E. ELAM, OF WASHINGTON, DISTRICT OF COLUMBIA.

TOBACCO-PIPE.

No. 921,527.     Specification of Letters Patent.     Patented May 11, 1909.

Application filed January 13, 1909. Serial No. 472,123.

*To all whom it may concern:*

Be it known that I, WILLIAM E. ELAM, citizen of the United States, residing at Washington, in the District of Columbia, have invented certain new and useful Improvements in Tobacco-Pipes, of which the following is a specification, reference being had therein to the accompanying drawing.

My invention relates to tobacco pipes of the class in which the smoke duct is openable for cleaning, by means of a longitudinal slot, and the object is to provide a construction such that the cost shall not be materially greater than the cost of pipes having non-openable ducts, such that the closure shall be convenient and secure, even after long use of the pipe, and also such that an absorbent for fluids collecting in the pipe may be used in the closure member. With these objects in view the smoke duct is opened by means of a slot of suitable length surrounded by a continuous or endless seat for a closely fitting cup-like closure readily removable from its slot closing position.

In the accompanying drawings, Figure 1 shows in vertical longitudinal section a pipe embodying one form of my invention. Fig. 2 is a section on the line 2—2, Fig. 1. Fig. 3 is a view, similar to Fig. 1, showing a slightly modified construction, the stem and bowl being shown as separable. Fig. 4 is a section on the line 4—4, Fig. 3. Fig. 5 is a similar section of a different modification.

In Figs. 1 and 2, A represents the bowl, and B the stem of a pipe of any suitable material. The stem has its duct opened by a slot C of suitable length extending inward to the duct and preferably extending along the stem nearly to the bowl. Around this slot and at a short distance therefrom an endless groove D is formed in such manner as to leave around the slot an endless lip E which as a whole is frusto-pyramidal in form, its faces converging toward the slot, in passing outward from the bottom of the groove, to form a seat for a closure. The outer wall of the groove is preferably so inclined that the groove may be slightly V-shaped in cross section. Over this lip is pressed a cup-like closure F the diverging sides of which extend well into the groove and fit accurately upon the correspondingly inclined faces of the lip. The cup-like closure F is made deep enough to leave, when closed, a space in which may be placed absorbent material G, and for convenience it may be pivoted, or hinged, as shown, to the stem at H, and at the opposite end it is provided with a notch or projection I, to be engaged by the nail, or the like. Usually friction is relied upon to hold the member in closed position, and to allow it to adjust itself slightly the hinge or pivot connection is made with a certain amount of looseness or play.

In Figs. 3, 4 the lip surrounding the slot is made shorter so that it does not extend to the normal surface of the stem, and the closure is made shallower so that when closed it may lie within the general surface of the stem and be practically invisible while the pipe is in use. In this case the closure is shown as held in closed position by means of ring J sliding on the tapered stem, and provided below with an inwardly projecting lug K to act upon the closure. This lug is shown as formed by bending or indenting the ring, and to prevent the ring from slipping off the stem, the latter is provided with a suitable projection, shown as a knob L. An analogous ring may, of course, be used with any of the forms.

Fig. 5 illustrates the use of a slot-surrounding lip itself projecting beyond the general surface of the pipe so that the closure is wholly visible.

What I claim is:

1. The combination with a pipe provided with a longitudinal slot, having continuous walls, extending inward to its smoke duct and further provided with a closure seat entirely surrounding said slot, of a cup-like closure adapted to fit said seat, covering and hermetically closing said slot.

2. The combination with a pipe having its smoke duct opened longitudinally for a considerable portion of its length by a slot extending inward to said duct and externally surrounded by an endless lip, of a cup-like closure adapted to cover said slot and by its sides cut off all passing of air to the same.

3. The combination with a pipe provided with a duct-opening longitudinal slot surrounded by an endless lip, of a cup-like closure having flaring sides adapted to fit accurately around the correspondingly inclined lateral face of said lip.

4. The combination with a pipe having a longitudinal duct-opening slot surrounded by an inwardly-extending groove and having an intermediate lip, of a cup-like closure having its side wall adapted to enter said groove and to prevent air from passing to the slot.

5. The combination with a pipe having a longitudinal duct-opening slot surrounded by an endless lip, of a cup-like closure deeper than said lip and adapted to fit over the same, substantially as set forth.

6. The combination with a pipe having in its lower side a longitudinal duct-opening slot surrounded by a lip, of a cup-like closure adapted to fit over said lip, and a mass of absorbent material located in the bottom of the cup-like closure.

7. The combination with a pipe having a tapering stem provided with a longitudinal duct-opening slot surrounded by a lip, of a cup-like closure adapted to fit over said lip, and a closure locking ring sliding upon the stem.

8. The combination with a pipe having a tapering stem provided with a longitudinal duct-opening slot surrounded by a lip, of a cup-like closure adapted to fit over said lip, and a ring sliding upon the stem to lock said closure, said stem being provided with a projection to limit the movement of the ring toward the smaller end of the stem.

In testimony whereof I affix my signature in presence of two witnesses.

WILLIAM E. ELAM.

Witnesses:
JAMES L. CRAWFORD,
WALLACE GREENE.